Patented Nov. 1, 1927.

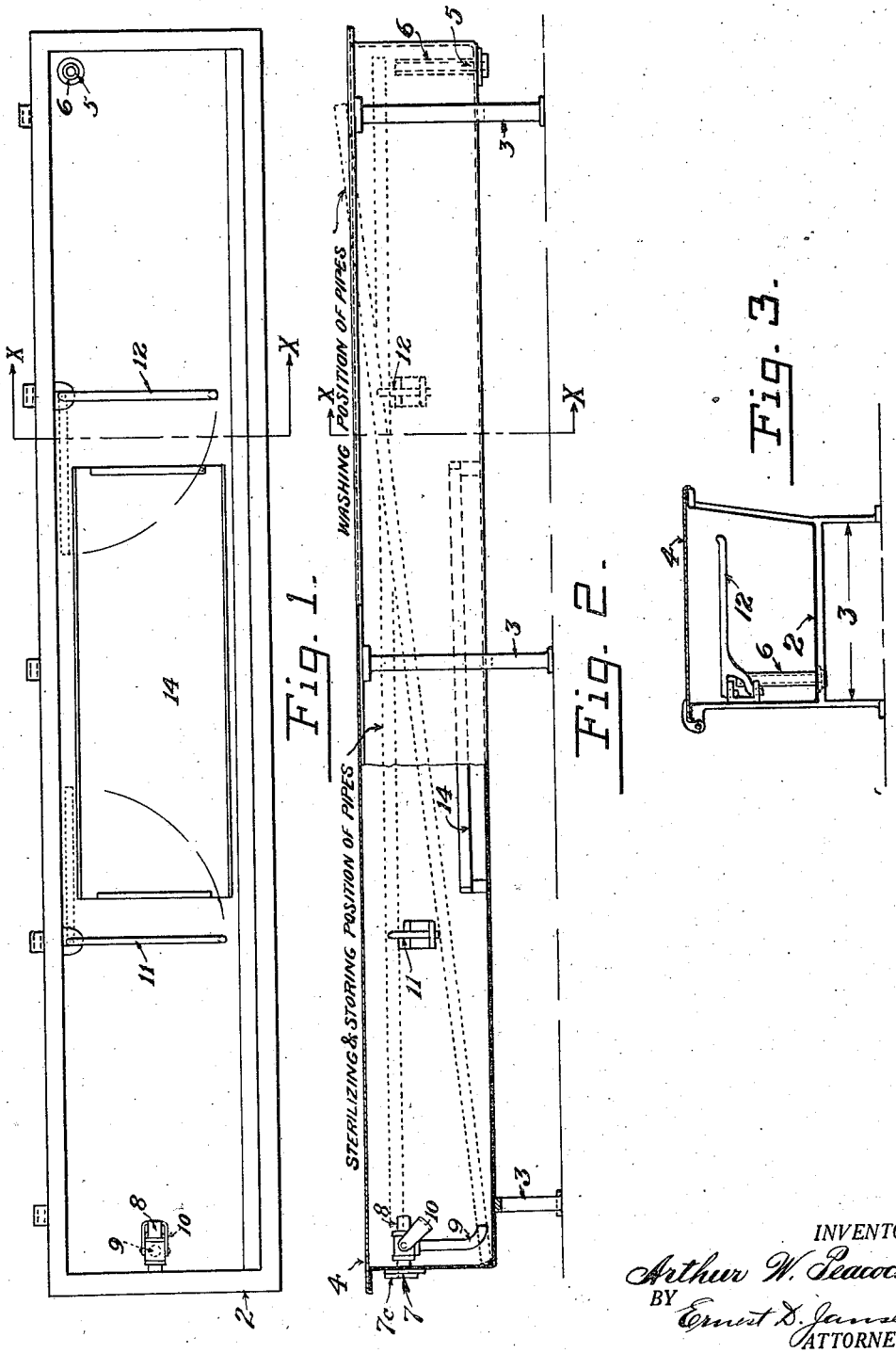

1,647,466

UNITED STATES PATENT OFFICE.

ARTHUR W. PEACOCK, OF ALBANY, NEW YORK.

MEANS FOR PRODUCING AND MAINTAINING A SANITARY CONDITION IN MILK PIPES AND THE LIKE.

Application filed December 26, 1925. Serial No. 77,809.

My invention relates to milk plant equipment, and the object of this invention is to provide means whereby the producing and maintaining of the proper sanitary and sterile condition of milk pipes and the like may be easily and quickly accomplished, and continued until such time as the sterilized parts are to be again placed in service; means which will be comparatively inexpensive, and whereby the necessary operations in cleansing and sterilizing of milk pipes and the fittings used therewith may be easily carried out.

The manner in which I accomplish my objects is illustrated in the accompanying drawings, in which:

Fig. 1 is a top plan view of my improved device, cover omitted;

Fig. 2 is a front elevation, part broken away, and

Fig. 3 is a cross section along the line X—X on the other figures.

The same reference characters refer to the same parts throughout the several views.

Referring to the drawings it will be plainly seen that my improved device or apparatus for use in cleansing, sterilizing, and storing milk pipes, fittings and et cetera, comprises an elongated vat 2, supported by suitable standards or legs 3, and provided with a close-fitting cover 4, preferably hinged to the vat. In the bottom of the vat there is provided a drain opening 5, normally closed by an elongated plug 6, preferably screwing into place and provided with an over-flow opening adapted to limit the depth of water which can normally be retained by the vat. An opening 7, normally closed by a gravity cover 7°, and adapted to be connected to a source of steam supply, by a hose if the device is to be movable, by a pipe if it is permanently installed in one location, is provided in one end of the vat and preferably at about the level on which the pipes will lie when in place on the pipe supports 11 and 12.

Projecting inwardly from the opening or port 7, is a spur 8, and leading downward therefrom is a branch 9. The free end of the spur may be provided with means, as the swinging shutter 10, whereby escape of steam therefrom may be prevented and the steam entering through the opening 7 be forced down the branch 9 and be discharged below the normal water level, and be commingled with the water so as to quickly raise the temperature thereof to the desired point.

Mounted in the vat 2, is a spaced pair of pipe supporting members 11 and 12, on which the milk pipes are placed to be sterilized and against one of which they may be rested during the washing and rinsing operations. After sterilizing they are to remain on these supports.

The supporting members are here illustrated as hinged brackets, the length of which is less than the width of the vat, leaving a space when in place thereacross, through which a milk pipe may be passed, thereby providing means whereby a pipe may be raised from the washing position indicated by dotted lines in Fig. 2, to the sterilizing and storage position, or where the pipes are supported on the two supports.

A removable tray 14, is included in the device, and is adapted to support fittings, and short lengths of pipe, which may be placed thereon for cleansing and sterilizing.

The top of this tray, 14, is to be slightly tilted when in position so that it will drain properly when the washing solution is drawn out of the vat. The relative height of the two pipe supports are to be slightly different so that the pipes will drain when in place thereon.

The manner in which my improved device is to be used is as follows:

Short lengths of pipe, and the pipe fittings are placed on the removable tray and placed in the vat, it having been previously supplied with the proper washing solution at the proper temperature, and washed or scoured in the usual manner. The longer milk pipes are then laid in the vat as illustrated by dotted lines in Fig. 2, one end resting against one of the pipe supports, in which position it is readily accessible for scrubbing with a usual long-handled pipe brush. After the ends of the pipes which are in the solution have been sufficiently washed, the pipes may be placed, one or two at a time, on the pipe support 11, and after all are so placed the support 12 is swung out from in under the opposite end and those ends will drop into the solution and into position to have those ends scrubbed. After the second end of the pipes have been thoroughly scrubbed, the washing solution is drained from the tank and the pipes are thoroughly rinsed, also the short lengths of pipe and the fittings which are on the tray. The rinsing is to be done with a hose connected to a source of supply of water under pressure, the drain opening remaining open during the time of the rinsing operation.

After the rinsing is finished the longer pipes are laid in place on the two pipe supports, the cover closed, and live steam introduced through the opening 7 for the purpose of sterilizing the contents of the vat. When the steam has been on for a sufficient length of time the supply is discontinued and the vat's contents allowed to stay therein until such time as the pipes and fittings are to be again put in service. The cover is not to be opened until that time. Leaving the pipes and fittings in the vat after having been cleansed and sterilized prevents the pipes from becoming contaminated from any usual source of contamination, thereby maintaining them in sterile condition.

I claim:

1. In a pipe washing, sterilizing and storage device, the combination of a trough shape vat with a steam inlet and a drainage outlet, means whereby steam introduced through the steam inlet may be discharged into the vat at different levels, a cover for said steam inlet, and a stopper for said drainage outlet with an overflow port therethrough, a spaced pair of hinged horizontally disposed pipe supports normally extending crosswise of the vat, a drainage tray fitting into the lower part of vat, and a close fitting cover for said vat.

2. In a pipe washing, sterilizing and storage device, the combination of a trough shape vat with a steam inlet and a drainage outlet, means whereby steam introduced through the steam inlet may be discharged into the vat at different levels, a stopper for said drainage outlet with an overflow part therethrough, a spaced pair of hinged horizontally disposed pipe supports normally extending crosswise of the vat, a drainage tray fitting into the lower part of vat, and a close fitting cover for said vat.

In testimony whereof I have affixed my signature.

ARTHUR W. PEACOCK.